April 13, 1926.
H. THOMAS ET AL
FIRST SLICE DEVICE
Filed May 5, 1923
1,580,933
6 Sheets-Sheet 1
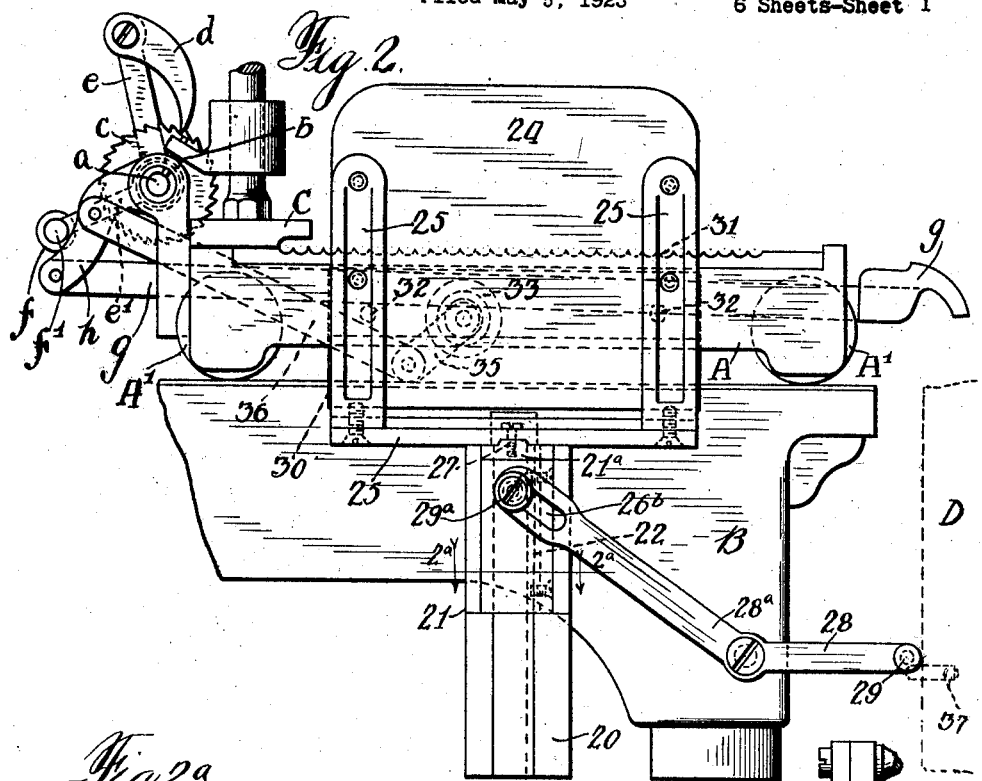
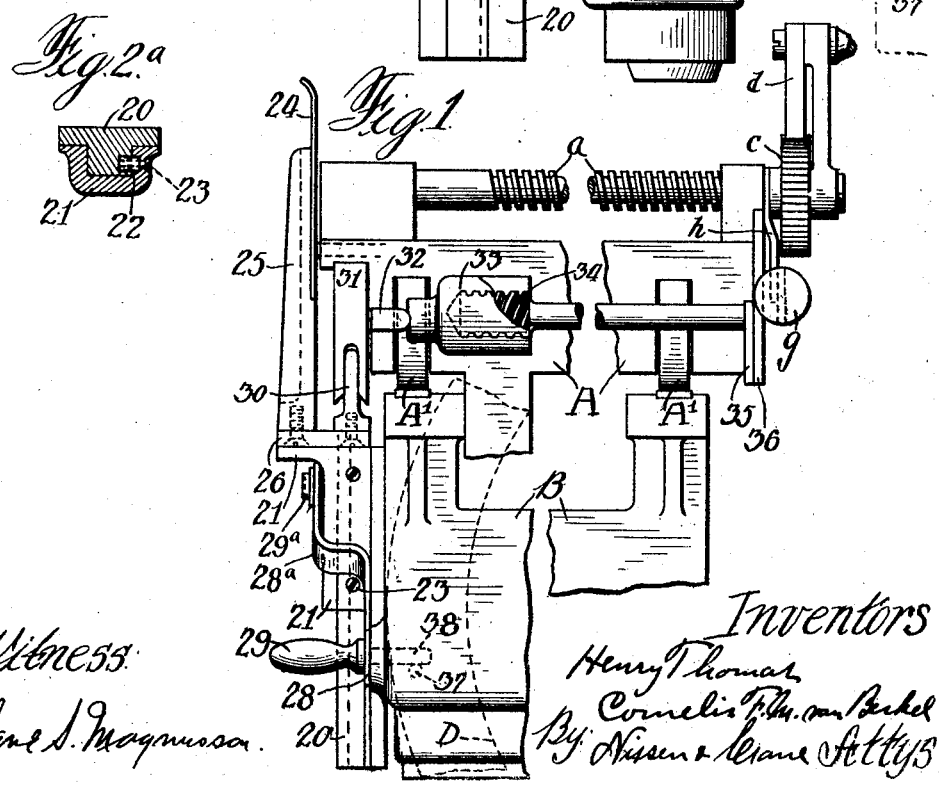

April 13, 1926. 1,580,933
H. THOMAS ET AL
FIRST SLICE DEVICE
Filed May 5, 1923 6 Sheets-Sheet 2
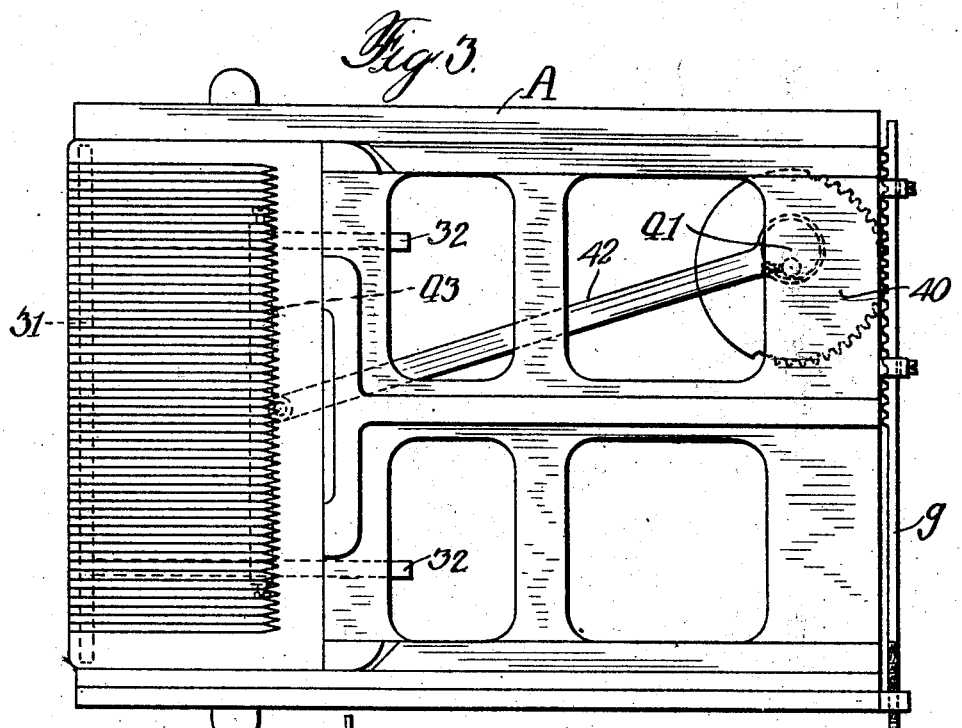
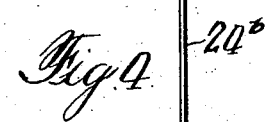

April 13, 1926.
H. THOMAS ET AL
1,580,933
FIRST SLICE DEVICE
Filed May 5, 1923
6 Sheets-Sheet 3
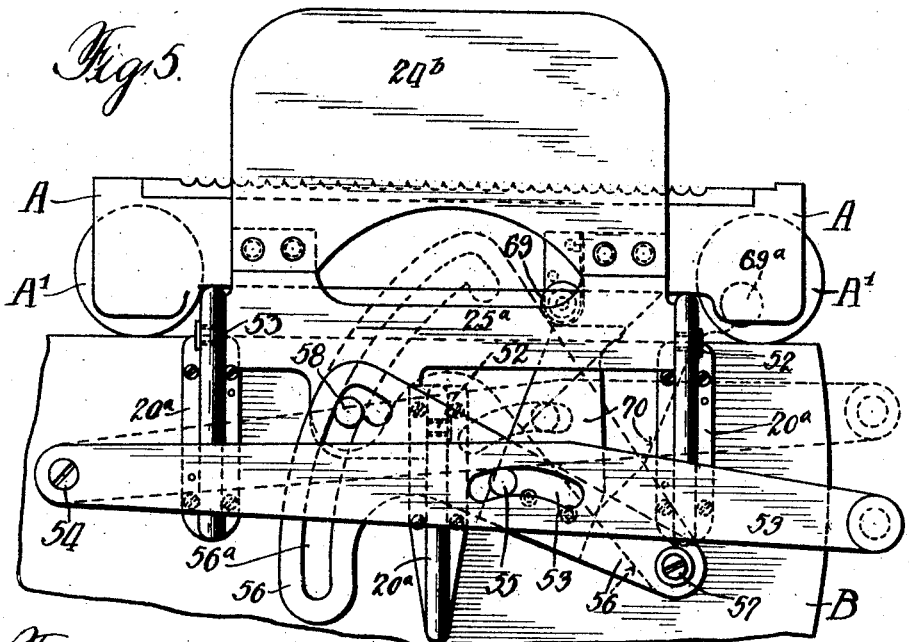
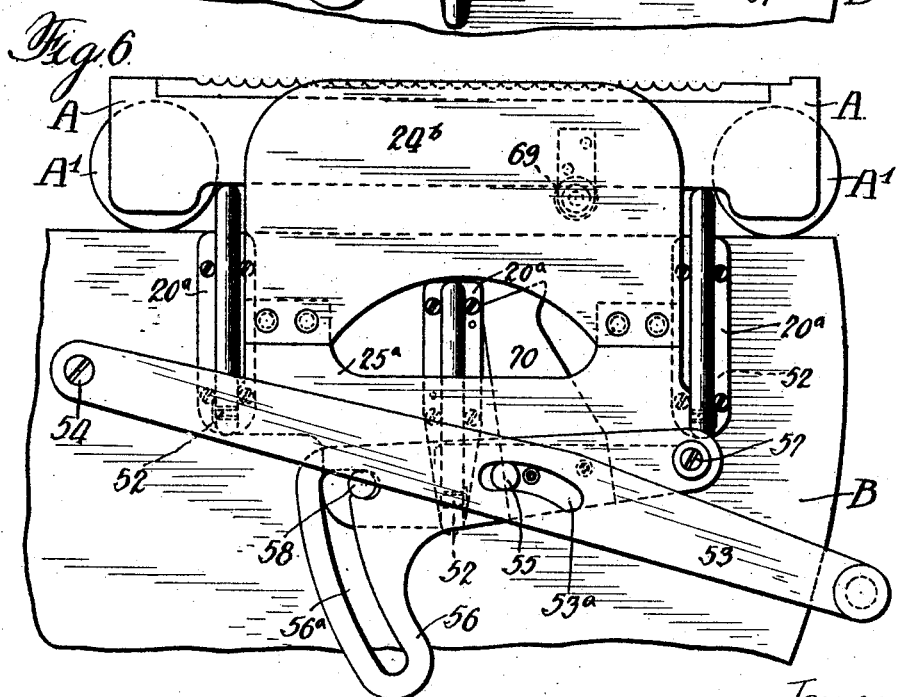

April 13, 1926.

H. THOMAS ET AL
FIRST SLICE DEVICE
Filed May 5, 1923

Witness:
Dave S. Magnuson

Inventor:
Henry Thomas
Cornelis F. M. van Berkel
By Nissen & Crane Attys.

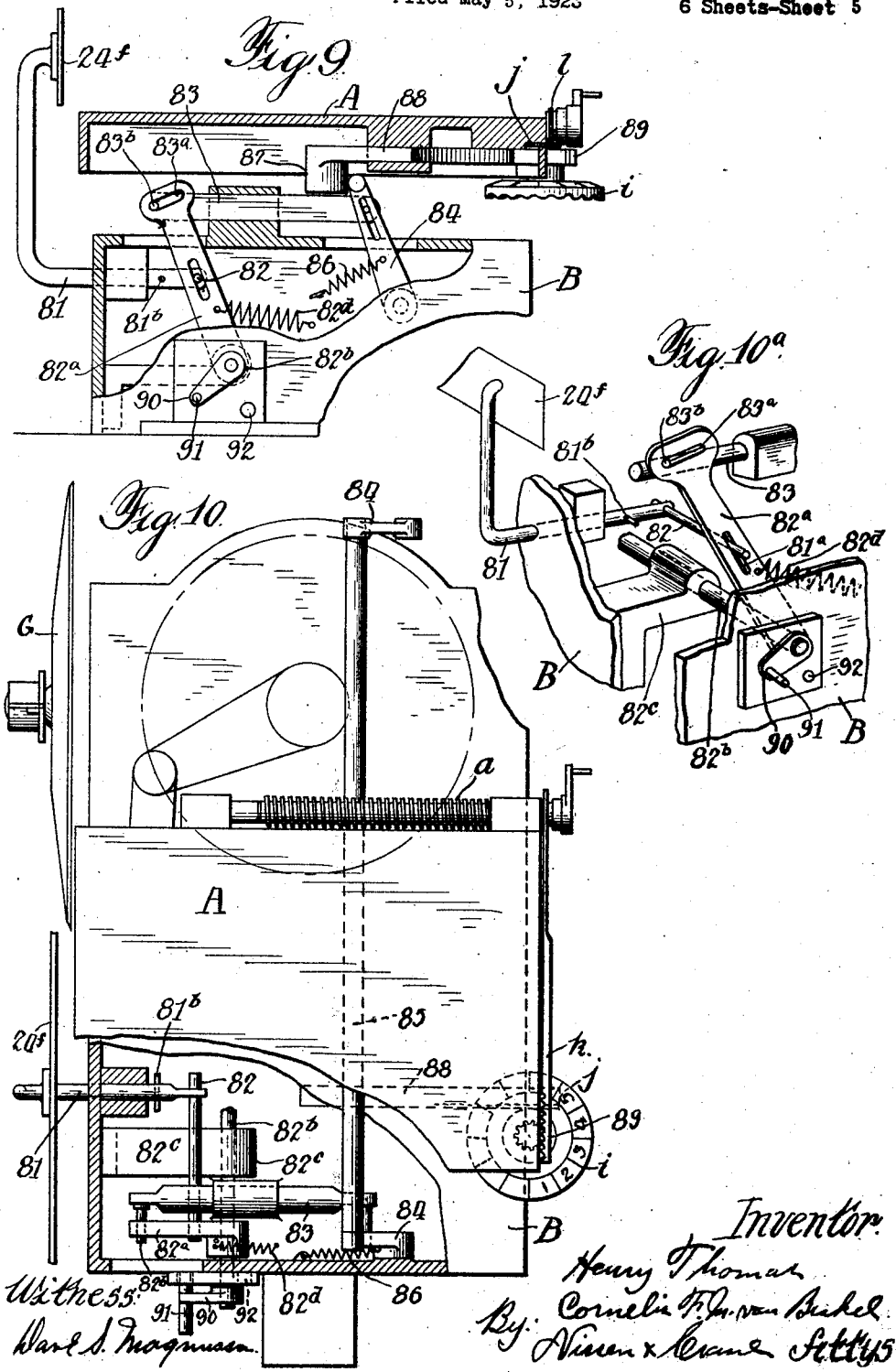

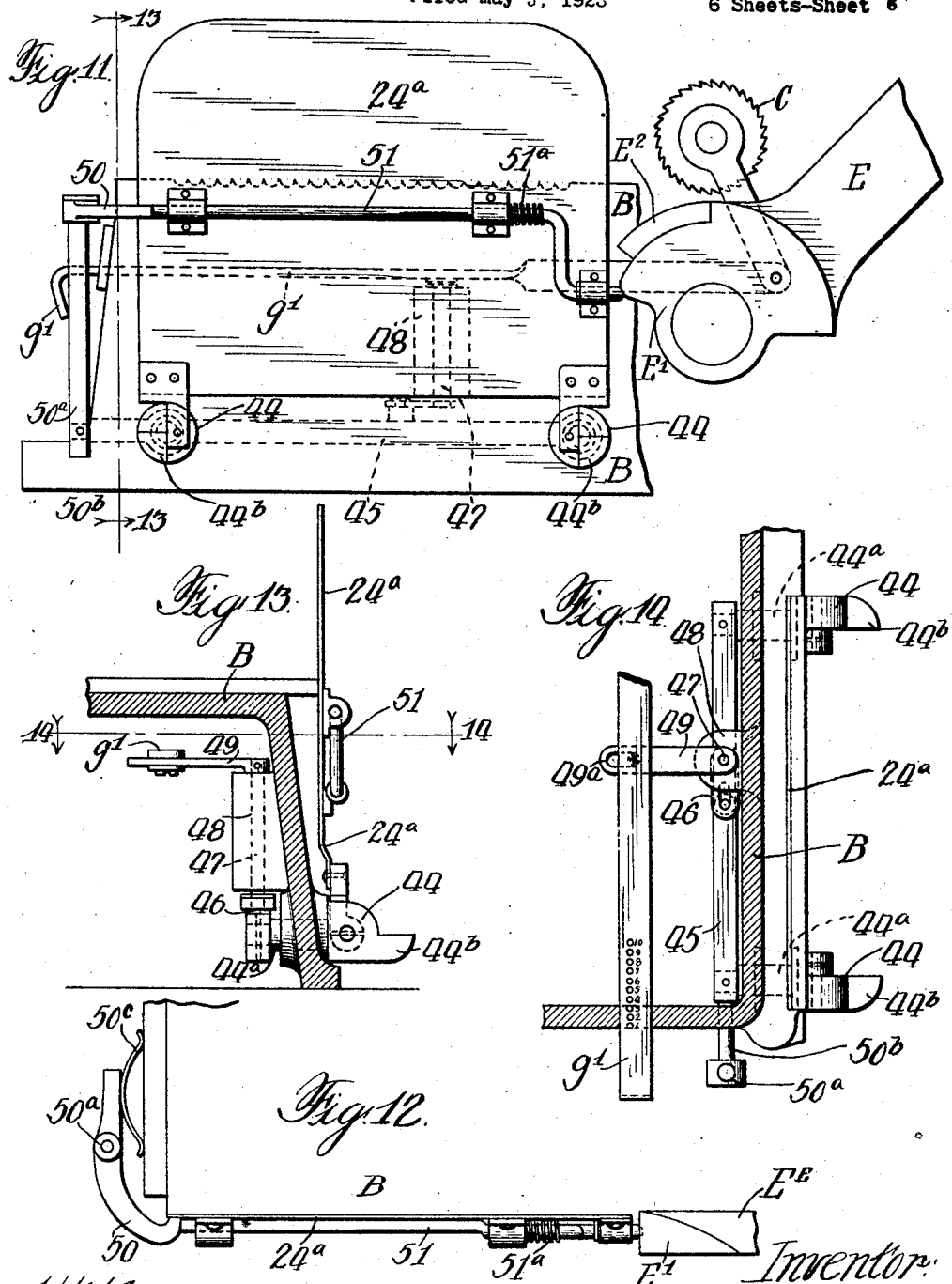

Patented Apr. 13, 1926.

1,580,933

UNITED STATES PATENT OFFICE.

HENRY THOMAS, OF LONDON, ENGLAND, AND CORNELIS F. M. VAN BERKEL, OF ROTTERDAM, NETHERLANDS, ASSIGNORS TO U. S. SLICING MACHINE COMPANY, OF LA PORTE, INDIANA, A CORPORATION OF INDIANA.

FIRST-SLICE DEVICE.

Application filed May 5, 1923. Serial No. 636,831.

*To all whom it may concern:*

Be it known that we, HENRY THOMAS, a subject of the King of England, residing at East Ham, London, England, and CORNELIS F. M. VAN BERKEL, a subject of the Queen of the Netherlands, residing at Rotterdam, Netherlands, have invented certain new and useful Improvements in First-Slice Devices, of which the following is a specification.

This invention relates to machines for slicing meat and other substances.

In such machines, as generally constructed, means are provided for automatically advancing relative to the cutter the supporting table or plate for the substance to be sliced (sometimes referred to hereinafter as the "meat support") with an intermittent or stepwise movement so that after a slice is severed by the action of the cutter the leading or front face of the uncut portion of the substance (sometimes hereinafter referred to as the "meat") will be advanced past the cutting plane a distance equal to the required thickness of the next slice.

Now it frequently happens when using meat slicing machines that after one or more slices have been cut from a piece of meat, it has to be temporarily removed from the machine which may, for example, be more urgently required for slicing another kind or piece of meat, and, when the first piece is replaced, it seldom occupies the correct position with its leading or front face in the cutting plane or parallel to said plane and at a distance therefrom equal to the distance or an exact multiple of the distance which the meat support advances at each step. Because of this the first slice, or slices, cut on the replacement of the piece is, or are, irregular in shape and thickness, and is, or are, very often unsaleable for that reason. These irregularties are particularly disadvantageous when meat, such as bacon or ham, is to be sliced for frying or grilling, since non-uniformity in thickness renders a slice less suited for this purpose.

Some known forms of slicing machines, however, have fence plates or abutments against which the meat is pressed and which are capable of being adjusted or initially set by hand for the purpose of determining the thickness of the slices to be cut. These arrangements although they eliminate the aforesaid difficulty arising from the improper positioning of the meat to be sliced, are not altogether satisfactory, mainly because they hinder free access to the meat support from the front and because in the case of a machine of the reciprocating carriage type, the surface of the meat is wiped across the plate or abutment at each reciprocation of the table of the carriage past the cutter, unless the plate or abutment is first moved separately by hand to a non-operative position.

As distinct from these known arrangements the present invention consists of a slicing machine having an abutment for positioning the meat or other substance to be sliced which can be moved automatically to an inoperative position after adjustment of said substance. The position of the abutment can also be automatically regulated by or from a suitable part of the machine, preferably the feed regulating mechanism. The invention comprises other subsidiary features of novelty.

The invention can be carried into effect in many ways some of which are illustrated, merely by way of example, on the accompanying drawings to which reference will now be made.

On the drawings—

Fig. 1 is an end elevation, and Fig. 2 a side elevation of part of a slicing machine of the reciprocating carriage type and fitted with an abutment arranged to be set automatically upon actuation of the usual feed mechanism regulator and to be moved automatically to an inoperative position upon movement of the carriage. Fig. 2ª is a section on the line 2ª—2ª of Fig. 2.

Fig. 3 is a plan showing another arrangement for automatically setting the abutment upon actuation of the usual feed mechanism regulator.

Fig. 4 is a side elevation, and Fig. 5 a front elevation showing another arrangement wherein the abutment is set independently of the usual feed regulating mechanism. Fig. 6 is a view similar to Fig. 5 but showing the abutment and appertaining parts in the operative position.

Fig. 7 is an end elevation, and Fig. 8 a plan showing still another arrangement wherein the abutment is set independently of the usual feed regulating mechanism.

Fig. 9 is a cross-section, and Fig. 10 a plan (partly in section) showing another arrangement wherein the abutment is set automatically upon actuation of the feed mechanism regulator. Fig. 10ᵃ is a perspective view showing the mechanism for rendering the abutment inoperative.

Fig. 11 is a front elevation, Fig. 12 a plan, Fig. 13 a section on the line 13—13 of Fig. 11, and Fig. 14 a section on the line 14—14 of Fig. 13, showing another arrangement as applied to a slicing machine of the stationary carriage or table type.

In Figs. 1 and 2, A denotes the carriage mounted on rollers $A^1$ and adapted to be reciprocated on the machine base B past the rotary cutter (not shown). Slidable on the carriage in a direction at right angles to its line of travel is a meat support C, part of which is shown only in Fig. 2. At each reciprocation of the carriage the support is advanced a step ready for the severance of the next slice by means of feed mechanism comprising a feed screw $a$ rotatably carried by the carriage and a nut $b$ carried by the support and adapted to engage the feed screw. On the latter is a ratchet $c$ engaged by a pawl $d$ carried by a bell crank lever $e$, $e^1$ whose arm $e^1$ carries a roller $f$ which during reciprocation of the carriage engages a fixed cam surface and is thereby lifted against the action of spring means to turn the feed screw through the medium of the pawl and ratchet and so advance the support C. On the return movement of the lever $e$, $e^1$ by said spring means the pawl $d$ overrides the ratchet teeth. The angle through which the feed screw is turned at each reciprocation of the carriage can be adjusted by the feed regulator $g$ which is pivoted to an arm $h$ mounted to swing about the axis of the feed screw and engage the projecting pin $f^1$ of the roller $f$. As the feed regulator is pushed in or pulled out the bell crank lever $e$, $e^1$ is turned in one direction or the other, thereby altering the initial setting of the roller $f$ relative to its actuating cam and causing a correspondingly smaller or larger angular movement of the feed screw upon reciprocation of the carriage. These parts and the manner in which they operate are well known but have been here briefly described in order that the invention relating to the abutment for properly positioning the substance on the support C and now to be referred to, may be better understood.

Secured to the front wall of the machine base B is a guide 20 (see also Fig. 2ᵃ) on which is mounted for vertical sliding movement a bracket 21, the parts being retained against lateral displacement by a key or feather 22 secured to the bracket by screws 23. The plate or abutment 24 is attached to brackets 25, 25 connected by a horizontal member 26 which is arranged to slide along the top wall of the bracket 21 towards and away from the front wall of the machine base B or the plane of the cutter, said top wall having a tongue 21ᵃ which fits in a corresponding groove in the member 26 and the parts being held together by a screw 27 in the tongue engaging a slot in the member. It will thus be apparent that the abutment 24 can be raised and lowered vertically with the bracket 21 to an operative and inoperative position respectively and can also be moved horizontally with respect to said bracket to a position in relation to the cutter equal to the required thickness of the slices to be cut.

The bracket 21 can be raised and lowered through the medium of a bell-crank lever 28, 28ᵃ pivoted to the base B, the arm 28 having a handle 29 and the arm 28ᵃ being formed with a slot 26ᵇ through which projects a stud 29ᵃ on the bracket. The slot 26ᵇ is undercut at its upper end so that when the lever is actuated to raise the bracket 21 and therefore the abutment 24, the stud will engage said undercut portion and retain the parts in the raised position, as shown in Fig. 2.

On the horizontal member 26 is a tongue 30 (Fig. 1) adapted in the raised position of the bracket 21 to engage a grooved member 31 having pins 32, 32 which slidably engage in corresponding openings in the front wall of the reciprocating carriage A, and said grooved member carries a nut 33 engaged by a screw 34 connected by a lever 35 and link 36 with the arm $h$ of the feed mechanism.

By reason of this connection, when the feed regulator $g$ is moved to adjust the feed as determined by the initial setting of the pawl lever $e$, $e^1$, the screw 34 is partially rotated relative to the nut 33 and thereby moves the grooved member 31 to such a position that when it is engaged by the coacting tongue 30, the abutment 24 will be caused to take up a position parallel to the cutting plane and at a distance in advance thereof equal to one step of the feed or to the desired thickness of the slices as determined by the feed regulator. If the substance to be cut is then placed on the support C with its leading face in engagement with the abutment it will be properly located to obtain a full first slice equal in thickness to the further and succeeding slices to be cut.

Upon rotating the usual fly wheel D (part only of which is shown in dotted lines, Fig. 1) to move the carriage towards the cutter in known manner, a stop 37 thereon engages under a pin 38 projecting from the arm 28 of the lever 28, 28ᵃ and automatically trips the lever to lower the bracket 21 and therefore the abutment 24 to an inoperative position clear of the front of the support C before the first slice is cut, in which position the substance does not wipe across the face of the abutment during the movements of the carriage A.

The groove in the member 31 is bell-mouthed in order to guide the tongue when the bracket 21 is raised properly into engagement therewith no matter in what position it may have been set from the feed regulator. The tongue 30 and grooved member 31 may, of course, be reversed and, if desired, these can be replaced by any other suitable connection. For example, rollers may be used instead of the tongue.

Regarding the mechanism for causing the abutment to move automatically to the inoperative position when no longer required, although this is shown as being operated from the fly wheel, it might be operated by the movement of the carriage or any other convenient part of the machine, the essential feature being that the abutment is moved automatically to an inoperative position as soon as the carriage is moved to present the meat to the action of the cutter.

Instead of the screw and nut connections 33, 34 between the feed regulating mechanism and the abutment 24, it is obvious other arrangements may be used to obtain the desired result. For example, in Fig. 3, which is a plan of the reciprocating carriage A of a slicing machine, the feed regulator $g$ is formed with teeth which mesh with the teeth of a pinion 40 rotatably mounted on the table and connected by an eccentric 41, rod 42, and head piece 43 with the pins 32, 32 of the member 31. When, therefore, the regulator is moved the pinion 40 is turned and a sliding movement is thereby imparted to the member 31 (by reason of the connection 40, 41, 42) which is thus set relative to the front of the carriage and to the cutter in accordance with the amount the meat support is fed at each step, so that the abutment will be automatically set, as in the arrangement described with reference to Figs. 1 and 2, when it is raised to the operative position.

In the construction according to Figs. 4, 5 and 6, the abutment 24$^b$ is arranged to be set relative to the cutter independently of the feed regulating mechanism of the machine. It is carried by a plate or bracket 25$^a$ having three rollers 52 each of which works in a slotted guide 20$^a$ secured to the front wall of the machine base on which the carriage A is adapted to be reciprocated. The intermediate roller is at a lower level than the others, whereby the abutment is constrained to an upright position. At their upper ends the slots in the guides 20$^a$ are inclined, as shown in Fig. 4, and on that account after the abutment has been raised an amount sufficient to bring the rollers to the base of the inclined portions of the slots (Figs. 4 and 5) further upward movement will have the effect of moving the abutment horizontally away from the front of the carriage A as is required to position it according to the thickness of the slices to be cut.

The abutment is raised by means of a hand lever 53 pivoted at 54 and adapted to move past a graduated scale (indicating the slice thicknesses) on the base B. The lever has a slot 53$^a$ into which projects a pin 55 carried by a quadrantal lever 56 pivoted at 57 to the base B and having an arcuate slot 56$^a$ into which projects a pin 58 on the abutment bracket 25$^a$.

If with the parts in the inoperative position shown in Fig. 6, the lever 53 is raised the quadrantal lever 56 will be turned about its pivot 57 by reason of the pin and slot connection 55, 53$^a$ and this will raise the abutment 24$^b$ by reason of the pin and slot connection 58, 56$^a$. When the lever 53 is at zero on the scale the rollers 52 are at the base of the inclined portions of the slots in the guides 20$^a$ and the pin 58 is in the position in the slot 56$^a$ shown in Fig. 5. The slot 56$^a$ is struck from a center below the center of the pivot 57 so that further upward movement of the lever 53 (say to the dotted position shown in Fig. 5) forces the rollers 52 up the inclined portion of the slots in the guides 20$^a$, thereby moving the abutment horizontally to the required position in advance of the cutting plane as determined by the position of the lever 53 relative to the scale on the machine base B. The shape and disposition of the arcuate slot 56$^a$ automatically retains the abutment (by frictional contact of the pin 58 with the side wall of the slot) in any position to which it may be moved from zero upwards until such time as it is moved to the inoperative position which occurs automatically as soon as the carriage is reciprocated by a roller 69 on the carriage as it moves from dotted position 69$^a$ to the left, engaging a stop 70 secured to the quadrantal lever 56, thereby moving the latter downwards about its pivot 57 and causing the parts to assume finally the inoperative position, Fig. 6. This will be easily understood if it is considered that when the lever 53 is set, say at mark 11 on the scale, as shown in dotted lines, Fig. 5, the stop 70 will also be in the dotted position shown and will be pushed down by the roller 69 (as it travels to the left from the position 69$^a$) until the zero position is reached when the frictional grip of the pin 58 is relieved and the parts fall to the inoperative position, Fig. 6, by gravity.

Instead of retaining the abutment 24$^b$ in the operative position by the frictional contact of the pin 58 with the side wall of the slot 56ª, other means may be employed, such as a spring-pressed ball carried by the lever 53 and adapted to engage indentations in the scale or indicator.

In the arrangement according to Figs. 7 and 8, the abutment 24ᵉ is also adapted to be set independently of the feed regulating mechanism of the machine but in this case it is arranged to be moved to an inoperative position horizontally by frictional contact of the substance to be sliced. The abutment 24ᵉ is mounted for sliding movement towards and away from the edge of the cutter by means of a flange 24ˣ slidably fitted on a bracket 71, being retained in position by means of screw pins 72, 72 passing through slots 73, 73 in the flange of the abutment into screw-threaded openings in the bracket. The bracket itself is mounted for horizontal sliding movement towards and away from the plane of the cutter on pins 74, 74 secured to the base B and is constrained away from the front wall of the carriage A by springs 75, 75 on said pins. At one end the abutment carries a graduated notched quadrant 76 with which engages a stop 77 on a lever 78 pivoted at 79 to one of the pins 74 and connected at its other end by a link 80 with the bracket. The quadrant 76 is constrained into engagement with the stop 77 of the lever 78 by a spring 77ª attached at its one end to the flange 24ˣ of the abutment and at its other end to one of the pins 72.

When the lever 78 is turned about its pivot 79 past the quadrant 76 the bracket 71 will be moved horizontally along the pins 74, 74 and will cause the abutment 24ᵉ to take up a position with respect to the cutter corresponding to the position of the stop 77 on the scale of the quadrant and it will be apparent that the lever can be moved to give any desired setting of the abutment according to the thickness of the slices to be cut. If now, after the quadrant has been set, the substance to be sliced is clamped in position on the meat support so that it contacts with said abutment then, as soon as the carriage A is reciprocated, the frictional contact of the meat with the abutment 24ᵉ will immediately move the latter along the bracket 71 (against the action of the spring 77ª) towards the edge of the cutter an amount permitted by the pin and slot connection 72, 73, and this will have the effect of withdrawing the quadrant 76 from engagement with the stop 77 on the lever whereupon the springs 75, 75 will at once come into action to move automatically the bracket 71 and therefore the abutment 24ᵉ along the pins 74, 74 to an inoperative position clear of the substance whilst the spring 77ª will act to return the quadrant into engagement with the stop 77.

Instead of relying on the frictional contact of the meat to move the abutment clear thereof a number of pins may project from the face of the abutment to engage the meat, said pins being made sufficiently short to ensure that they will be withdrawn from the meat when the abutment is moved to the inoperative position under the action of the springs 75, 75 which, as already stated, occurs immediately the abutment is moved with the meat towards the knife so as to disengage the quadrant 76 from the stop 77.

If desired, the quadrant 76 can be omitted and the lever 78 connected with the feed regulator by suitable mechanism, such for example as described with reference to Fig. 3 and so that said lever will be operated simultaneously with the feed regulator to set the abutment 24ᵉ according to the thickness of the slices to be cut.

Referring now to Figs. 9, 10 and 10ª, in the machine here illustrated the feed for the meat support is determined in known manner by means of a wheel or grip $i$ rotatably carried by the reciprocable carriage A. On the wheel spindle is a gear $j$ engaging a rack $k$ which also meshes with a gear $l$ loose on the feed screw $a$ and regulates the movement of the feed screw by any suitable and well known mechanism, not shown, according to the amount the grip or wheel $i$ is turned. In this case the abutment 24ᶠ is set automatically from the feed regulator but is arranged to be moved to an inoperative position by hand. It is carried by an arm 81 slidable in an opening in the front wall of the machine base B and having a rod 82 which projects through a slot 81ª in a lever 82ª fixed on a shaft 82ᵇ journaled in a bracket 82ᶜ and projecting through an opening in the side wall of the base B (Fig. 10ª). At its upper end the lever 82ª is formed with an arcuate slot 83ª into which projects a pin 83ᵇ carried by one end of a slidable rod 83 whose other end is connected to one of a pair of swinging arms 84, 84 which support a cross bar 85. The latter is constrained by a spring 86 into engagement with a stop 87 on a rack 88 meshing with a gear wheel 89 on the feed regulator spindle. Secured on the outer end of the shaft 82ᵇ is an arm 90 carrying a spring stop 91 capable of engaging a hole 92 in the side wall of the base. A spring 82ᵈ constrains the lever 82ª to the right (Fig. 10ª) so that the left-hand end of the arcuate slot 83ª normally engages the pin 83ᵇ on the slidable rod 83. 81ᵇ is a stop pin on the arm 81.

If, with the parts in the position shown, the feed regulator $i$ is turned, then, simultaneously with the setting of the feed regulating mechanism for the feed screw $a$, the abutment 24ᶠ will be correspondingly set relative to the plane of the cutter G through the medium of the linkage just described so that the substance to be sliced can be properly located on the support with its leading face in engagement with the abutment, as in the previous constructions.

After this has been done the abutment can be moved to an inoperative position clear of the substance by simply turning the arm 90 in an anti-clockwise direction until the spring stop therein engages the hole 92. During this movement the lever 82ª will swing about the axis of the shaft 82ᵇ in opposition to the spring 82ᵈ, thereby moving the abutment away from the table A, but owing to the pin and arcuate slot connection between the lever and the rod 83 the latter will not be moved but will remain in its original position as determined by the setting of the feed regulator.

The spring 82ᵈ is made sufficiently strong to prevent the abutment being moved under any slight pressure exerted thereagainst in positioning the meat. The abutment acts only as a guide and in adjusting the meat the pressure exerted thereagainst will, with ordinary care, not be sufficient to move the abutment away from its set position.

Instead of the arrangement described the arm 81 may be connected with the rod 83 through the medium of a detachable coupling such that after setting the abutment from the feed regulator, these parts can be uncoupled to allow of the abutment being moved independently to an inoperative position.

So far the invention has been described with reference to machines of the reciprocating carriage type, but it is also applicable to machines wherein the meat table is stationary and the cutter is caused to oscillate or reciprocate whilst rotating. One arrangement suitable for this type of machine is illustrated in Figs. 11 to 14 wherein E denotes the swinging arm which carries the cutter. In this case the abutment 24ª is hinged to lugs 44, 44 having stems 44ª, 44ª slidable in conforming holes in the front wall of the fixed table or base B and connected by a bridge piece 45 inside said base. The bridge piece is connected by a pin and slot connection to a crank 46 on a spindle 47 journaled in a boss 48 on the base and said spindle is connected in turn with the feed regulator $g^1$ by its crank 49 and pin and slot 49ª. It will thus be seen that when the regulator is actuated to give the desired feed to the meat support the abutment 24ª is also moved from the cutting plane to a position therefrom equal to the amount the support is to be fed at each step, that is equal to the thickness of the slices to be cut.

The abutment 24ª is held in the vertical or operative position by a catch 50 pivoted on a rod 50ª attached to an extension 50ᵇ of the member 45 and constrained to engage the abutment by a spring 50ᶜ (see particularly Figs. 11 and 12). As soon as the cutter is moved towards the table B, however, a projection E¹ on the cutter arm E acts on the end of a bolt 51, (which is mounted for sliding movement on the back of the abutment and is constrained to the right (Fig. 11) by a spring 51ª), thereby causing said bolt to release the catch 50, whereupon the abutment falls about its hinges to a horizontal or inoperative position clear of the meat support where it rests on extensions 44ᵇ, 44ᵇ of the lugs 44, 44. To ensure that the abutment 24ª will fall, the swinging arm E for the knife or cutter has a wedge piece or cam E², which forces the abutment outwards away from the table.

When the abutment is moved by hand back into the vertical position it trips past the catch 50 which then returns under the action of the spring 50ᶜ to engage the abutment. When the abutment is being set to the operative position by movement of the feed regulator the rod 50ª and spring catch move also.

Although in the foregoing we have described the various arrangements by which an abutment can be set and also moved to an inoperative position when no longer required, the invention is not to be taken as limited to these constructions as it will be obvious to those skilled in the art that many changes may be made without departing from the spirit or scope of the invention as defined by the appended claims. For example, the abutment instead of being a flat plate, may take the form of strips of metal spaced apart to give a more open view, (or a series of rollers may be used).

Having now particularly described and ascertained the nature of our said invention and in what manner the same is to be performed, we declare that what we claim is:

1. The combination with a slicing machine, of an abutment member for locating material to be sliced, means for moving the material to be sliced during a slicing operation, and means controlled by said slicing machine to displace said abutment member away from the path of movement of said material when said slicing machine is operated.

2. The combination with a slicing machine, of an abutment member for locating material to be sliced, means for moving the material to be sliced during a slicing operation, means for setting said abutment member to locate material to produce a slice of predetermined thickness, and means for automatically displacing said abutment member away from the path of movement of said material when said machine is operated.

3. The combination with a slicing machine having a reciprocating table, of an abutment member positioned adjacent the path of movement of said table for gauging the position of the material on said table to give a slice of predetermined thickness, and means controlled by the operation of said slicing machine for automatically displacing said abutment member when said machine is operated to permit free movement of the material on said table.

4. The combination with a slicing machine having a reciprocating table, a support mounted on said table for feeding movement in a direction transverse to the movement of the direction of said table, an abutment member positioned adjacent the path of movement of said table, means for locating said abutment member various distances from the cutting plane of said machine corresponding to different thicknesses of slices to be cut, and means controlled by the slicing operation of said slicing machine for displacing said abutment member when said slicing machine is operated.

5. The combination with a slicing machine having a reciprocating table and a support mounted thereon for movement in a direction transverse to the direction of movement of said table to feed material on said table to the cutting plane of said machine, said support being movable in steps of different amounts corresponding to different thicknesses of slices to be cut, an abutment member for initially locating material on said support, means for positioning said abutment member different distances from the cutting plane of said machine corresponding to different thicknesses of slices to be cut, and means for automatically displacing said abutment member when said machine is operated to permit movement of the material on said support free from contact with said abutment member.

6. A slicing machine having an abutment for positioning the substance to be sliced, means for moving said material to cause a slice to be severed therefrom, and means whereby the said abutment can be automatically moved to an inoperative position away from the path of movement of said material after adjustment of said substance and at the beginning of a slicing operation.

7. A slicing machine having feed regulating mechanism, an abutment for positioning the substance to be sliced and means for automatically regulating the position of said abutment by the feed regulating mechanism.

8. A slicing machine having an abutment for positioning the substance to be sliced, means for regulating the position of said abutment by or from the feed regulating mechanism of the machine, and means for moving said abutment to an inoperative position.

9. A slicing machine having feed regulating mechanism, an abutment for positioning the substance to be sliced, means for automatically regulating the position of said abutment by the feed regulating mechanism, and means whereby the abutment can be moved to an inoperative position by hand.

In testimony whereof I, HENRY THOMAS, have signed my name to this specification on this 6th day of April, 1923.

HENRY THOMAS.

In testimony whereof I, CORNELIS F. M. VAN BERKEL, have signed my name to this specification on this 17th day of April, 1923.

CORNELIS F. M. VAN BERKEL.